US005196242A

United States Patent [19]

Vicino

[11] Patent Number: 5,196,242

[45] Date of Patent: Mar. 23, 1993

[54] SELF-INFLATING FOAM STRUCTURE

[76] Inventor: Robert K. Vicino, 6064 Mohler St., San Diego, Calif. 92120

[21] Appl. No.: 706,783

[22] Filed: May 29, 1991

[51] Int. Cl.[5] .......... B32B 1/00; B32B 3/00

[52] U.S. Cl. .......... 428/12; 428/71; 428/76; 40/610

[58] Field of Search .......... 428/12, 71, 76, 7, 9; 40/326, 406, 538, 610, 624

[56] References Cited

U.S. PATENT DOCUMENTS

| | | | |
|---|---|---|---|
| 2,997,100 | 8/1961 | Morris | 5/348 |
| 3,329,750 | 7/1967 | Growald | 428/71 |
| 3,378,864 | 4/1968 | Cornes | 5/450 |
| 3,521,424 | 7/1970 | Wirfel | 428/71 |
| 3,611,455 | 10/1971 | Gottfried | 5/348 |
| 3,675,377 | 7/1972 | Suter | 428/71 |
| 3,849,225 | 11/1974 | Haertle | 156/213 |
| 3,864,766 | 2/1975 | Prete, Jr. | 5/337 |
| 3,872,525 | 3/1975 | Lea et al. | 5/358 |
| 4,025,974 | 5/1977 | Lea et al. | 5/367 |
| 4,039,363 | 8/1977 | Robertson | 428/71 |
| 4,054,204 | 10/1977 | Keeton | 428/12 |
| 4,149,919 | 4/1979 | Lea et al. | 156/213 |
| 4,261,776 | 4/1981 | Lea et al. | 156/213 |
| 4,269,890 | 5/1981 | Breittling et al. | 428/71 |
| 4,271,620 | 6/1981 | Vicino et al. | 40/406 |
| 4,274,158 | 6/1981 | Pogorski et al. | 428/71 |
| 4,369,591 | 1/1983 | Vicino | 40/610 |
| 4,372,071 | 2/1988 | Vicino | 40/624 |
| 4,416,073 | 11/1983 | Vicino et al. | 40/326 |
| 4,447,974 | 5/1984 | Vicino et al. | 40/538 |
| 4,540,611 | 9/1985 | Henderson | 428/12 |
| 4,624,877 | 11/1986 | Lea et al. | 428/71 |
| 4,776,121 | 10/1988 | Vicino | 40/610 |

OTHER PUBLICATIONS

Varilite Brochure, 1990 Casdade Designs, Inc.

*Primary Examiner*—William J. Van Balen
*Attorney, Agent, or Firm*—Henri J. A. Charmasson

[57] ABSTRACT

A self-erecting structure consists essentially of a block of open-cell foam material, the outer surface of which has been sculptured into three-dimensional formations completely enveloped by an airtight skin. The structure can be pressed to expel any air or other fluid out of the foam material and any internal void through a bleeding aperture which is then sealed, thus keeping the structure into its collapsed state. Upon opening of the aperture, the foam bounces back to its original state sucking in ambient air and restoring the structure to its full size. Embodiments of the invention include three-dimensional displays, decoys, habitats, toys, and advertising props. The foam structure may be formed by molding, cutting spraying, or compressing. The airtight skin may be applied by molding, bonding, spraying or by singeing the surface of the foam.

34 Claims, 3 Drawing Sheets

SELF-INFLATING FOAM STRUCTURE

FIELD OF THE INVENTION

This invention relates to inflatable structures and more particularly to inflatable structures of elaborate shapes used in displays and other informational structures.

BACKGROUND OF THE INVENTION

Inflatable structures are used to replicate or create large forms or objects with varying degrees of realism, and at a relatively low cost. Samples of such structures are disclosed in my prior U.S. Pat. Nos. 4,271,620; 4,372,071; 4,416,073; 4,447,974; and 4,776,121.

One of the main advantages of inflatable structures is that they can be deflated for storage or shipment, then reinflated to their original dimension when desired. The inflatable technology is particularly effective for creating large forms including temporary shelters, and giant advertising displays. The principal drawbacks of inflatable structures is that they may collapse if punctured or if the source of continued pressurized fluid is interrupted. Another problem with inflatable structures is the inability to render detailed three-dimensional forms with a reasonable degree of fidelity. An inflated pliable envelope tends to assume rounded forms without any squared corner or sharp features. Even with the help of complex gussetting, totally flat surfaces cannot be achieved. Inflatable structures always appear with rounded or bulging sides which greatly limit their ability to represent certain objects.

SUMMARY OF THE INVENTION

The principal and secondary objects of this invention are to provide for the replication or creation of various objects and structures with a high degree of realism through inflatable structures which do not require any source of compressed fluid, while retaining the convenience of collapsing such objects or structures into compact shapes for storage or shipment. The invention overcomes the above-described problems and disadvantages inherent to inflatables by using a resilient structural element to fill the fluid chamber as well as to provide and maintain three-dimensional surface formations. The resilient material is preferably an open-cell foam such as polyurethane formed into the shape of the object then covered with a thin, airtight skin. When the air or other internal fluid is removed by compression or vacuuming, the structure is reduced to only a fraction of its original dimension. When air is allowed to penetrate the structure, it returns automatically to its original size and shape.

One of the major benefits of the invention is that such an inflated structure is completely immune to punctures and completely independent of any pressurized fluid source.

DESCRIPTION OF THE PREFERRED EMBODIMENT OF THE INVENTION

Figure 1:
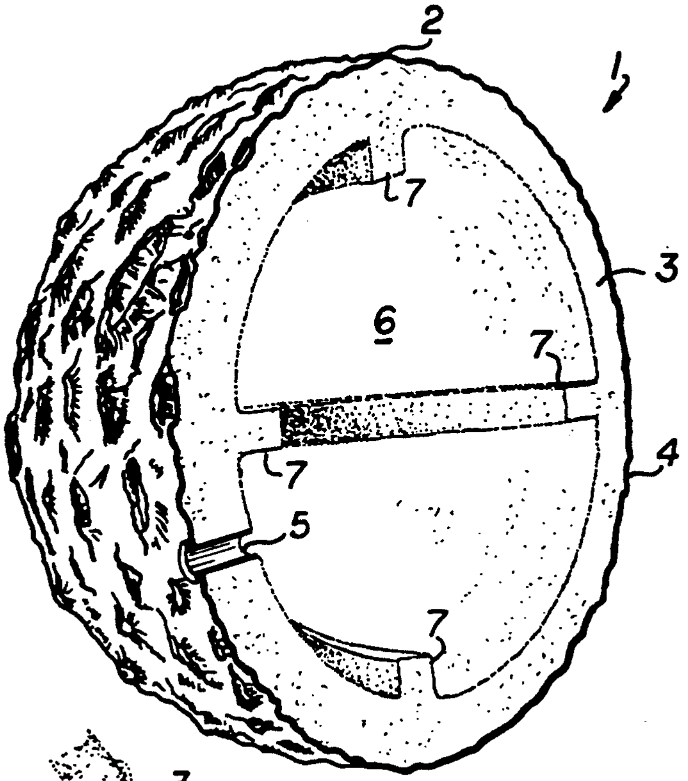
FIG. 1 is a perspective view of a section of a first embodiment of the invention.

The first embodiment of the invention 1 is illustrated in FIG. 1 as a three-dimensional model of the moon which consists essentially in a hollow sphere where the lunar landscape is sculpted into the outer surface 2 of a layer 3 of polyurethane, open-cell foam. The sculptured outer surface is covered by an air-tight skin 4 which has a closable aperture 5 leading to the empty central core 6. A series of internal reinforcing ribs 7 are formed integrally with the foam layer 3, and projects radially into the empty core cavity 6. When air is sucked through the aperature 5 out of the core 6 foam layers 3 and ribs 7, the replica collapses to about 5 percent of its inflated size. In lieu of the vacuum suction, the replica could be deflated by compressing it or folding it. If the orifice 5 is then closed by a plug, the device will remain in its collapsed state for storage or shipment. As soon as the orifice 5 is reopened, ambient air rushes inside the replica as the resilient foam material bounces back to its original state. The circular internal ribs 7 provide structural reinforcement to help return the object to its full size and stabilize its spherical shape. Even if the foam has a low density, poor memory, or demonstrate a high histeresis on its volume versus pressure graph, the object will eventually assume its original appearance.

Figure 2:
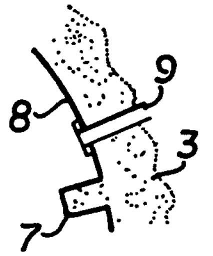
FIG. 2 is a diagrammatical illustration of a first alternate construction thereof.

In the first alternate construction of the first embodiment illustrated in FIG. 2, an inner skin 8 is applied to the inside surface of the foam layer 3. The inner skin 8 acts as a bladder which can be reinflated through the orifice 9 to assist the foam layer in returning to and maintaining its initial shape.

Figure 3:
FIG. 3 is a diagrammatical illustration of a second alternate construction thereof.

In the second alternate construction of the first embodiment illustrated in FIG. 3, no internal or external air-tight skin is used, the layer of foam 3 can only be deflated by compression, or by inserting the replica into an airtight bag from which air is sucked with a vacuum pump. In this type of construction, the number and size of the internal ribs 10 may have to be increased to compensate for the loss of rigidity due to the absence of an internal or external skin.

Figure 4:
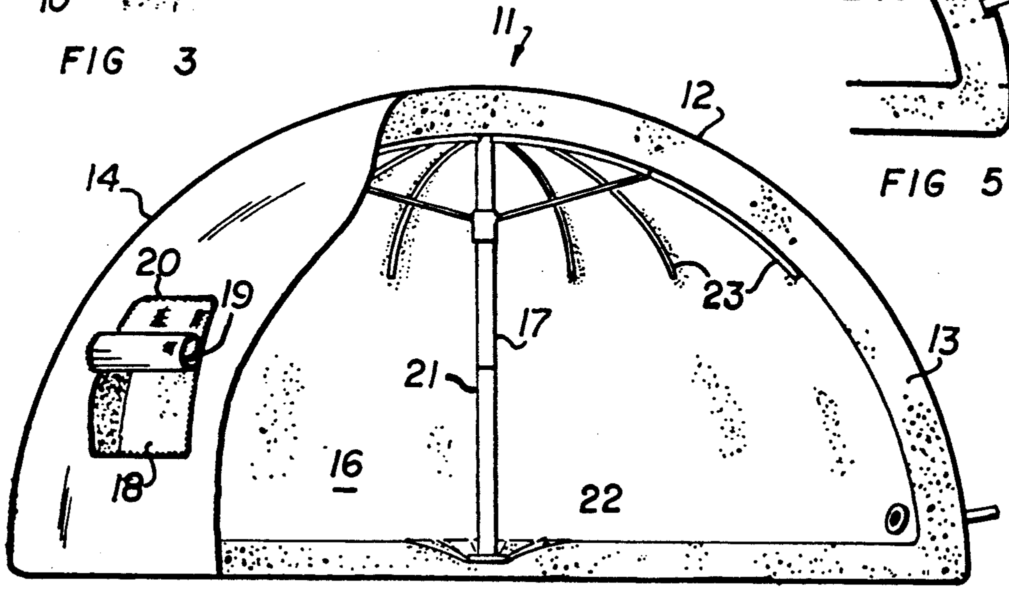
FIG. 4 illustrates a second embodiment of the invention.
Figure 6:
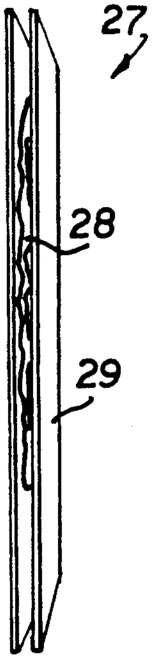
FIG. 6 is a perspective illustration of a third embodiment of the invention combined with a greeting card shown in the closed position.
Figure 7:
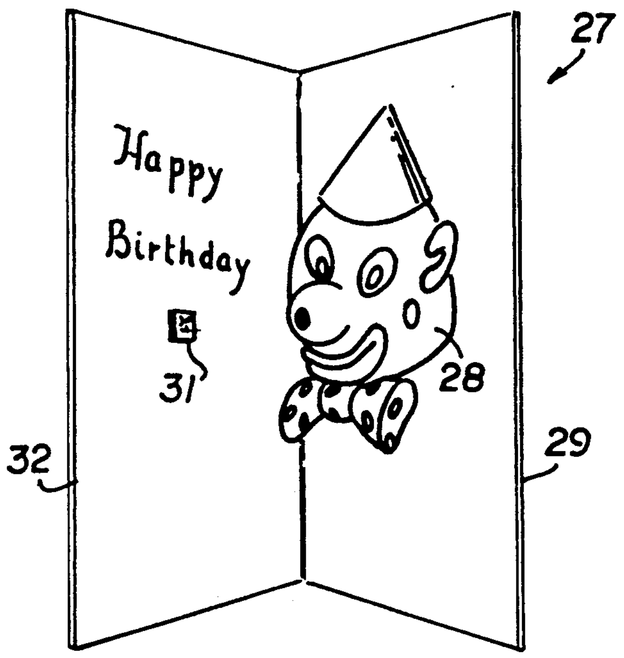
FIG. 7 is another perspective view thereof showing the card in the open position.

The second embodiment of the invention illustrated in FIG. 4 is a temporary shelter 11 which uses the same foam layer 13 and air-tight skin 14 elements of the first embodiment of the invention. Here, the foam layer 13 need not have an outer surface 12 sculptured to represent any kind of three-dimensional formation, but is rounded to a smooth semi-spherical surface. The outer skin 14 and the foam layer 13 are penetrated by an air tube 15 which is used to suck the air out of the inside 16 of the shelter as well as out of the foam layer as in the preferred embodiment once the access port 18 has been tightly sealed by an air-tight window 19 with slide fasteners 20. A collapsible structure 17 similar to a parasol infrastructure supports the dome-shaped shelter. It comprises a mast 21 which can be erected on the floor 22 of the shelter and a set of arcuate ribs 23 which are deployed against the roof of the shelter.

Figure 5:
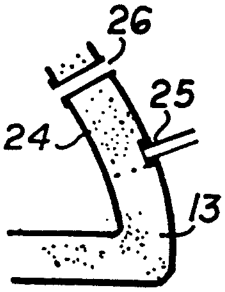
FIG. 5 is a diagrammatical illustration of a first alternate embodiment thereof.

In the alternate construction of the second embodiment illustrated in FIG. 5, a second, air-tight skin 24 is applied against the inner surface of the foam layer 13. Once the supporting structure 21 has been removed, the volume of the collapsed structure can be greatly reduced by sucking air out of the foam through the port 25. A second port 26 leading to the inside 16 of the shelter can also be used to further collapse the structure by removing all the air from the inside.

The various construction methods which have been discussed in connection with the first and second embodiments of the invention can be applied to a variety of other embodiments such as the three exemplary ones illustrated in FIGS. 6–10. In a third embodiment 27 of the invention, a foam and airtight skin structure 28 with or without an internal void is mounted on a panel 29 of a greeting card, and the reinflating air passage 30 is sealed. In this case the air orifice is sealed by a piece of adhesive 31 which is bonded to a second panel 32 of the greeting card so that the compressed and sealed structure 28 will automatically reinflate when the card is opened by separating the two panels 29, 32 for the maximum surprise effect.

Figure 8:
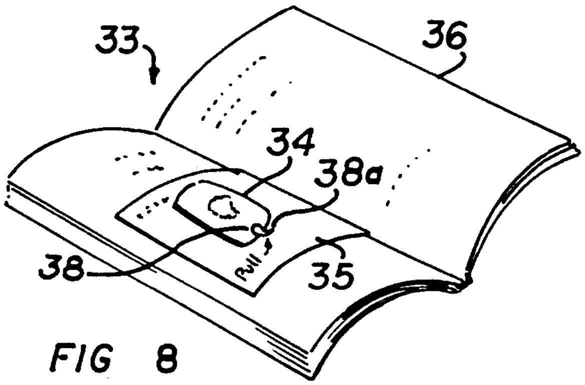
FIG. 8 is a perspective view of a fourth embodiment of the invention combined with a publication showing the embodiment in a deflated, compressed state.
Figure 9:
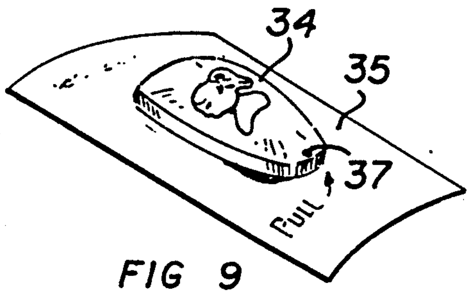
FIG. 9 is a perspective view thereof showing the embodiment in its inflated state.
Figure 10:
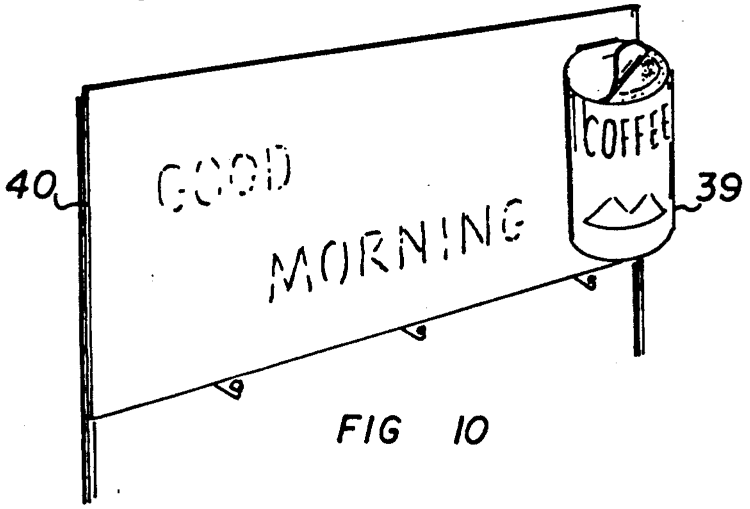
FIG. 10 is a perspective view of a fifth embodiment of the invention combined with an advertising billboard.

The fourth embodiment 33 of the invention illustrated in FIGS. 8 and 9 consists of a promotional replica of a product 34, in this case a bar of soap, which is compressed or vacuum-collapsed, then mounted on an insert 35 between pages of a magazine 36. The reinflating orifice 37 is sealed by an adhesive tape 38 with a pull-tab 38*a* which can be conveniently peeled off to reinflate the replica 34. In the fifth embodiment illustrated in FIG. 10, a product replica 39 is mounted against the face of an advertising billboard. The replica can be made to pulsate or periodically deflate and reinflate by using a vacuum pump to intermittently suck the air out of the replica 39.

The described embodiments are only a few examples of the numerous possible applications of the invention. Some of the preferred manufacturing techniques will now be disclosed.

Figure 11:
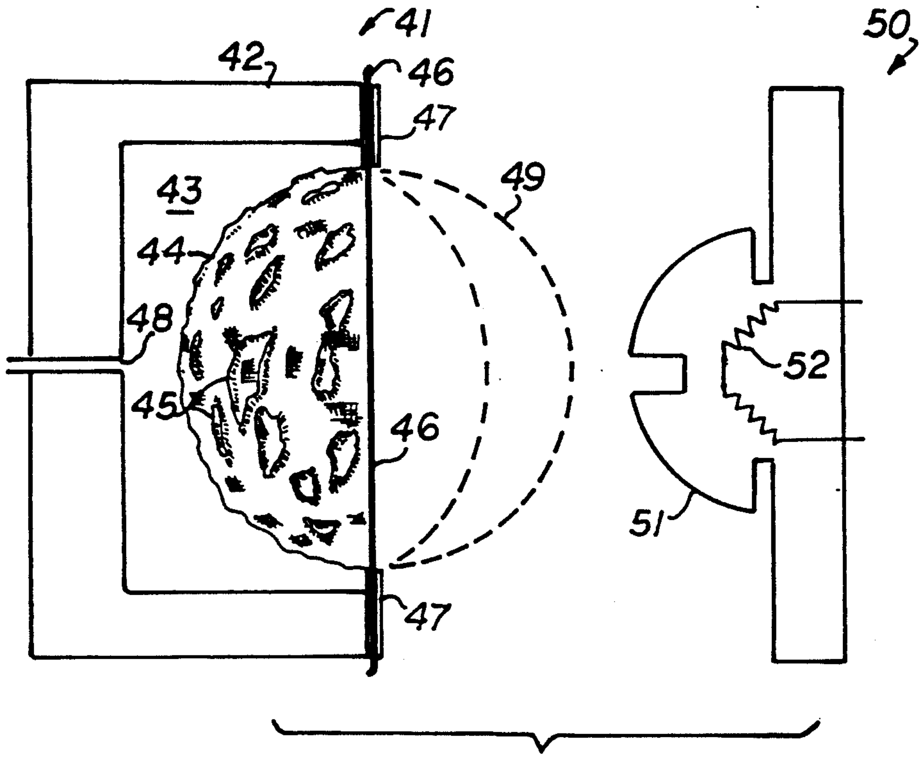
FIG. 11 is a diagrammatical illustration of a first type of molding apparatus.

A first molding apparatus is illustrated in FIG. 11 adapted to manufacture one half of the first embodiment shown in FIG. 1. The apparatus 41 comprises an armature 42 forming a cavity 43 into which is mounted a form 44 made of a rigid mesh material shaped to form a female mold for the moon replica including the three-dimensional surface formations 45 corresponding to the lunar landscape. A sheet of vinyl material 46 is spread over the armature to cover the mesh matrix 44 and is held in place by a ring 47. Hot air is blown into the armature through the orifice 48 in order to stretch the vinyl sheet as shown in dotted line 49 on the drawing. Once the sheet has been spread to a size roughly corresponding to the inner surface of the mesh matrix 44, a vacuum pump is used to suck all the air from inside the armature 42. The vacuum thus created causes the sheet 46 to intimately line the inside of the mesh matrix 44. The sheet thus molded constitutes the outer skin 4 of the moon replica. A precut slab of dry foam can then be glued to the shaped skin to form the foam layer 3 of the replica. Alternately, a molding plate 50 having a projection 51 which corresponds to the outline of the desired internal cavity is placed against the armature 42 and a non-yet hardened foam composition is injected between the skin-forming sheet 46 and the plate 50 to create the foam layer 3 including the reinforcing ribs 7. This last described manufacturing method is particularly adapted to make the structure illustrated in FIG. 5 in two separate halves which are later glued together.

Figure 12:
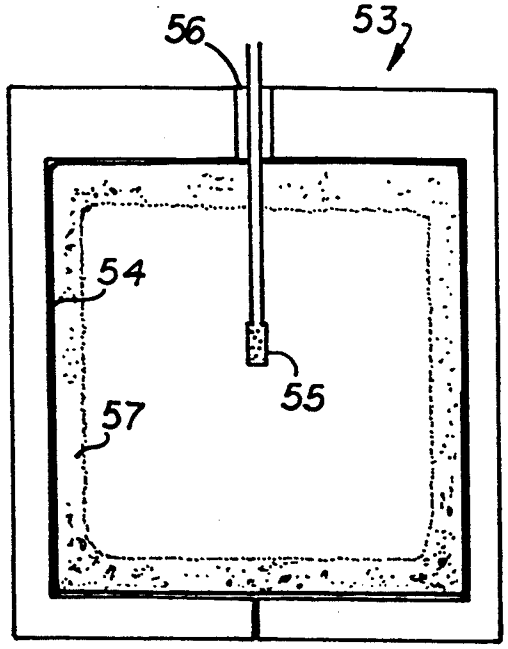
FIG. 12 is a diagrammatical illustration of a second type of molding apparatus.

The second molding apparatus illustrated in FIG. 12 comprises a mold 53 in two halves. The outer, airtight skin 54 is formed by spraying vinyl or other suitable material in molten form through the nozzle 55 inserted through an aperture 56 in the wall of the mold. Foam is sprayed against the vinyl skin 54 to form a thick layer 57. A second coat of vinyl may be sprayed in order to create an internal, airtight skin.

Figure 13:
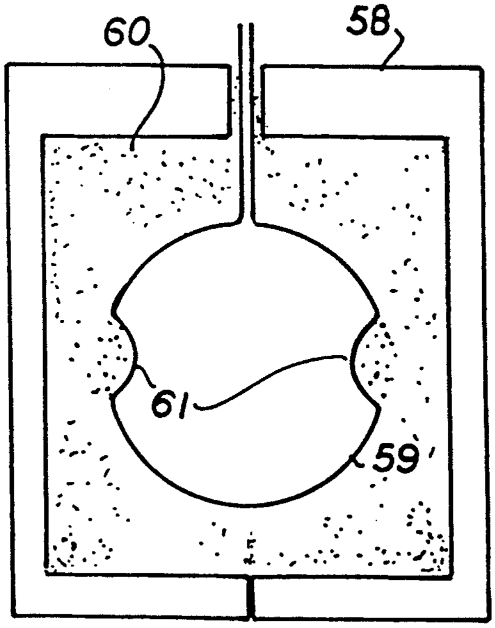
FIG. 13 is a diagrammatical illustration of a third type of molding apparatus.

In the third manufacturing apparatus illustrated in FIG. 13, a mold 58 similar to the one shown in FIG. 12 is used in combination with a bladder 59 made of synthetic, pliable material which is inflated in the center of the mold before foam 60 is injected into the mold. The bladder 58 has depressions 61 which result in the creation of reinforcing ribs integral with the foam layer 60.

It should be understood that the above-described various manufacturing processes may be combined to create a variety of structures corresponding to the various embodiments described earlier. For instance, the mold 53 illustrated in FIG. 12 could include a mesh matrix similar to the matrix 44 illustrated in FIG. 11 which can be easily contoured to reflect complex three-dimensional surface formations. Latex or other similar material could be sprayed against the inside surface of the foam layer after the plate 50 has been withdrawn in the first apparatus.

While the preferred embodiments of the invention have been described, modifications can be made and other embodiments may be devised without departing from the spirit of the invention and the scope of the appended claims.

What is claimed is:

1. A collapsible, self-erecting structure comprising:
   - a layer of resilient, dry, open-cell foam material inclosing a hollow central core;
   - an outer skin of pliable material covering said layer, said skin having an aperture forming an air passage leading to said central core and to said layer; and
   - means for closing said aperture.

2. The structure of claim 1, wherein an inner surface section of said layer comprises at least one resilient reinforcing conformation extending into said hollow core, said conformation being shaped, sized and positioned to maintain said core into a desired shape and size in the absence of any load applied to said structure other than gravity.

3. The structure of claim 2, wherein said conformation comprises a block of said foam formed integrally with said layer.

4. The structure of claim 3, wherein said skin is an airtight.

5. The structure of claim 3, which further comprises a coating of airtight material applied to the inner surface of said layer, whereby said hollow core forms an inflatable bladder.

6. The structure of claim 1 which further comprises three-dimensional formations defined into an outer surface portion of said layer.

7. The structure of claim 6, wherein an inner surface section of said layer comprises:

at least one resilient reinforcing conformation extending into said hollow core, said conformation being shaped, sized and positioned to maintain said core into a desired shape and size in the absence of any load applied to said structure other than gravity.

8. The structure of claim 7, wherein said conformation comprises a block of said foam formed integrally with said layer.

9. The structure of claim 7, which further comprises an airtight outer skin of pliable material covering said layer.

10. The structure of claim 1 which further comprises a collapsible structural member supporting a section of said layer, said member being shaped, sized and positioned to hold said section to a desired position under a specific load.

11. The structure of claim 10, wherein said member comprises a vertical post erected between a portion of said structure lying on a supporting surface and a upper inner surface section of said layer.

12. A collapsible, self-inflating object which comprises:

a slab of resilient, dry, open-cell foam material having three-dimensional formations defined into an outer surface section of said slab;

an outer skin of pliable, airtight material enveloping said slab and intimately covering said formations, said outer skin having an aperture forming an air passage to said slab; and means for releasably closing said aperture.

13. The object ɔf claim 12 which has been compressed to expel all fluid from said slab and enveloping skin and wherein said aperture has been sealed with said means for closing, whereby the object remains in a compressed state.

14. The combination of the object of claim 13 with a printed publication having a plurality of bound pages, wherein said object is inserted between two pages of the publication.

15. The object of claim 13 in combination with a planar, message-carrying panel wherein said object is bonded to said panel.

16. The combination of claim 15, wherein said panel forms part of a greeting card.

17. The structure of claim 1, in combination with an advertising billboard.

18. A collapsible, self-erecting object which comprises:

a block of resilient, dry, open-cell foam material having three dimensional formations defined into an outer surface section of said block;

said block having at least one internal cavity.

19. The object of claim 18, wherein an inner surface section of said block comprises at least one resilient reinforcing conformation extending into said cavity, said conformation being shaped, sized and positioned to maintain said block into a desired shape and size in the absence of any load applied to said structure other than gravity.

20. The structure of claim 19, wherein said conformation comprises a block of said foam formed integrally with said layer.

21. The structure of claim 18 which further comprises an inflatable airtight bladder within said cavity.

22. The object of claim 21 which has been compressed to expel all fluid from said slab and enveloping skin and wherein said aperture has been sealed with said means for closing, whereby the object remains in a compressed state.

23. The object of claim 22 in combination with a printed publication, wherein said object is inserted between two pages of the publication.

24. The object of claim 22 in combination with a planar message-carrying panel wherein said object is bonded to said panel.

25. The combination of claim 23, wherein said panel forms part of a greeting card.

26. The structure of claim 12 in combination with an advertising billboard.

27. A collapsible, self-erecting structure comprising:

a layer of resilient, dry, open-cell foam material enclosing a hollow central core, a bladder within said central core, said bladder being inflatable through an aperture passing through said layer and said bladder; and a means for closing said aperture.

28. The structure of claim 27, wherein an inner surface section of said layer comprises at least one resilient reinforcing conformation extending into said hollow core, said conformation being shaped, sized and positioned to maintain said core into a desired shape and size in the absence of any load applied to said structure other than gravity.

29. The object of claim 27 which has been compressed to expel all fluid from said bladder and wherein said aperture has been sealed with said means for closing, whereby the bladder remains in a compressed state.

30. The object of claim 29 in combination with a printed publication, wherein said object is inserted between two pages of the publication.

31. The object of claim 29 in combination with a planar, message-carrying panel wherein said object is bonded to said panel.

32. The combination of claim 21, wherein said panel forms part of a greeting card.

33. The structure of claim 27 in combination with an advertising billboard.

34. A collapsible, self-erecting structure comprising a layer of resilient, dry, open-cell foam material inclosing a hollow central core, and at least one resilient reinforcing conformation integral with said layer and extending into said hollow core, said conformation being shaped, sized and positioned to maintain said core into a desired shape and size in the absence of any load applied to said structure other than gravity.

* * * * *